June 21, 1966     M. E. MATHIS     3,256,693
LAWN WATERING DEVICE
Filed May 14, 1963
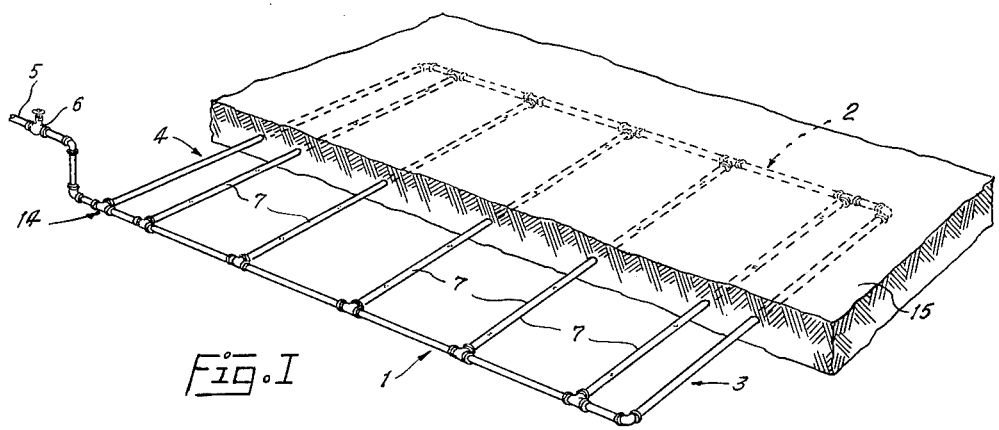
Fig. I
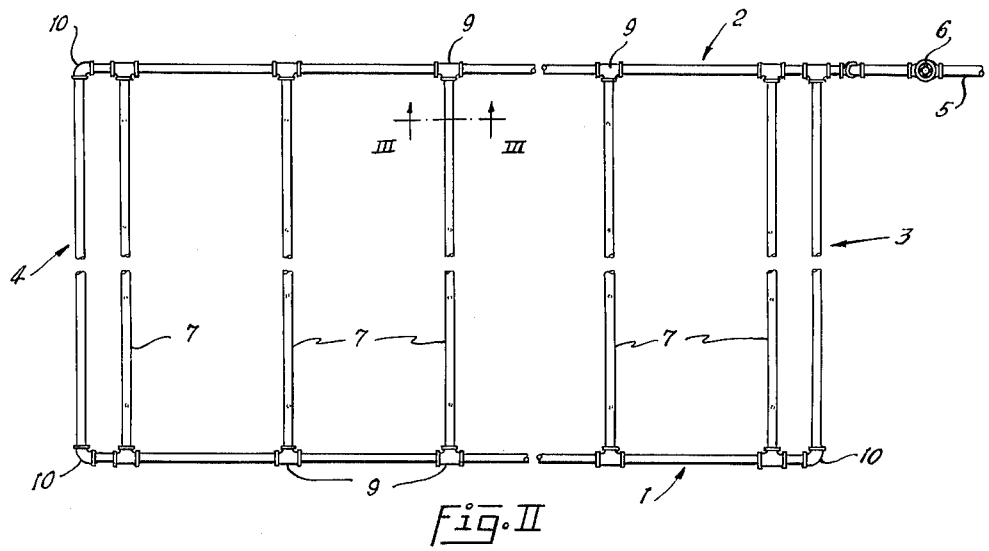
Fig. II
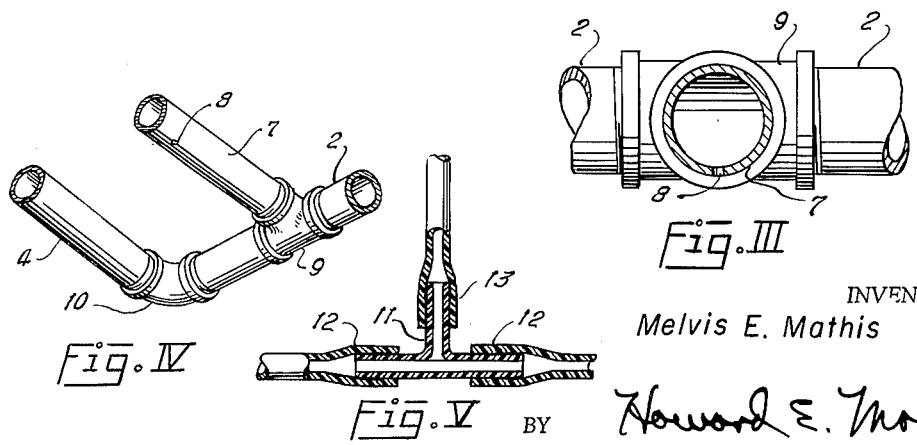
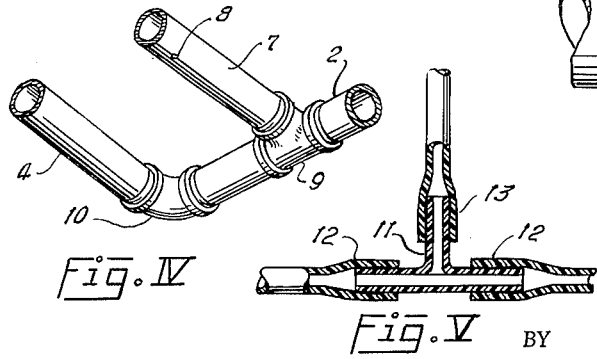
Fig. IV
Fig. V
INVENTOR
Melvis E. Mathis
BY Howard E. Moore
ATTORNEY United States Patent Office 3,256,693
Patented June 21, 1966

3,256,693
LAWN WATERING DEVICE
Melvis E. Mathis, P.O. Box 20742, Dallas, Tex.
Filed May 14, 1963, Ser. No. 282,193
2 Claims. (Cl. 61—13)

This is a continuation-in-part of application Serial No. 16,442, filed March 21, 1960, now abandoned.

This invention is concerned with a subsurface irrigation device and is particularly concerned with a watering device wherein a closed pattern of conduits, pipes or tubes are buried underneath the turf of a lawn or other planted area, so that water dispensed from the pipes through perforations provided in certain of the pipes soaks into the soil underneath the roots of the plants and upwardly about the roots from underneath so that no water is wasted by evaporation or runoff and none is blown away by the wind as in conventional springler systems.

Conventional sprinkler systems, either of the automatic type of single sprinkler devices, include spray heads or nozzles even with, or above, the surface of the ground so that spray from the nozzles is dispersed upwardly and is blown away by the wind, runs off of the surface, or evaporates.

In the present watering system the pipes are buried underneath the surface of the soil and below the roots of the plants, and the dispersal holes or passages in the pipes are directed downwardly, so that water dispersed from said pipes is required to soak through the earth upwardly around the roots of the plants.

Subsurface watering devices have heretofore been known, but such devices have included individual perforated dispersal pipes having closed ends, and connected to a header or directly to the water hydrant, so that as the water progressed along the pipes and was emitted through the perforations in the pipes toward the closed ends thereof, the pressure decreased so that a relatively small amount of water was dispersed through the perforations toward the outer ends of the closed pipes or hoses.

The present invention includes a closed circuit of unperforated peripheral pipes extending about a given area and having terminal portions connected directly, or closely adjacent, to the water source supplying pressure for the dispersal of the water; and perforated dispersal pipes are connected between parallel sides of the unperforated pipes constituting the closed circuit, so that pressure is equalized throughout the circuit and in the perforated pipes at all times so that an evenly distributed amount of water is dispensed through all of the perforations, securing uniform watering, and avoiding waste of water by applying too much water at some places and avoiding consequent damage to plants.

Preferably the perforations in the pipe are spaced along the lower sides thereof so that the water is directed downwardly as it is dispensed therefrom so that the water is required to soak upwardly through the soil to the roots of the plant, and there is no jetting action applied directly to the roots of the plant, which could remove soil from the roots or form cavities about the roots which could cause damage to the plant.

The objects of the invention are well stated hereinbefore, and other and further objects will become apparent upon reading the detailed specification hereinafter following, and by referring to the drawings annexed hereto.

A suitable embodiment of the invention is shown in the attached drawing wherein:

FIGURE I is a perspective view of the watering system, showing a segment of soil underneath which the pipes are buried and the connection by a globe valve to the water system;

FIGURE II is a top plan view of the watering system;

FIGURE III is an enlarged sectional view of a typical coupling, connecting two joints of the pipe or tubing making up the watering system;

FIGURE IV is an enlarged fragmentary view showing a corner connection connecting the unperforated peripheral pipes and an adjacent perforated pipe connected between the parallel sides of the closed peripheral pipes; and FIGURE V is a fragmentary, partially sectionalized view showing a modified form of connection between peripheral and tributary pipes wherein flexible plastic or rubber pipes are employed.

Numeral references are employed to designate the various parts shown in the drawings, and like numerals indicate like parts through the various figures of the drawings.

The numerals 1, 2, 3 and 4 generally indicate the perimeter pipes or tubes which are unperforated and provide a complete circuit about an area covered by the water system, connected with a water source pipe 5, which may be connected to the conventional municipal water system which customarily is delivered at about 50 p.s.i. It will be noted that the terminal points of the peripheral pipes are connected to the common water and pressure source, as indicated at 14, so that pressure is equalized at all times throughout the watering system. Flow into the water system may be controlled by a shut-off valve 6, suitably mounted in the line 5.

The peripheral pipes 1, 2, 3, and 4 are imperforate in that they do not have dispensing perforations therein as do the dispersal pipes which will be hereinafter described.

A plurality of perforated dispensing or tributary pipes 7 are connected between parallel unperforated peripheral pipes 1 and 2 in communication therewith so that water and pressure from the peripheral pipes may freely enter the cross pipes 7 at the ends thereof. It will be noted that pressure in the unperforated peripheral pipes 1, 2, 3 and 4 is equalized at all points about the circuit formed thereby. Therefore, the pressure in the pipes 7 is equalized at all points therein. The unperforated peripheral pipes provide a closed circuit about the area to be watered. It will be understood that the dispensing pipes 7 could be connected between the parallel peripheral pipes 3 and 4 and the same function and results would be attained.

The dispensing pipes 7 are provided with spaced perforations through the lower walls thereof, indicated at 8. These perforations 8 are preferably substantially equally spaced and are suitably spaced to cover the area to be watered to provide for the wetting of the soil over the entire area covered by the watering system.

Preferably the combined areas of the perforations 8 should not exceed the total interior cross-sectional area of the peripheral pipes 1, 2, 3 and 4 and the dispensing pipes 7 and the perforations are preferably of substantially equal diameter. This is desirable so that there will not be such pressure reduction in the pipes as to prevent proper dispersal of the water, there will be equal and uniform flow of water through the perforations, and so that there will be a jetting action through the perforations 8 to prevent the holes or perforations 8 from becoming stopped up.

As shown in the watering pipes, including the peripheral pipes 1–4, and the dispersal conduits 7 are buried underneath the soil 15 to sufficient depth to be disposed underneath the roots of the grass or plants which the system is intended to water.

The pipes, constituting the watering system, and which are buried underneath the ground, could be rigid metallic pipes, as shown, or they could be pipes made of flexible plastic material, such as polyethylene, which is corrosion resistant, durable and strong. It is also relatively inexpensive and easy to install.

As shown in FIGURES I–IV, the sections of metallic pipe are connected by hollow T-couplings 9, and at the corners are connected by L-couplings 10.

In FIGURE V is shown a modified form including a suitable connection for such plastic pipes 12 and 13 which may include a coupling, such as a T-coupling over which the ends of the flexible plastic pipes 12 and 13 may be stretched in order to provide sealed connections.

In operation, the valve 6 is turned on, admitting water from the supply pipe 5 into the watering system. The water and pressure flows into and about the peripheral pipes 1, 2, 3 and 4 and the pressure entering the system from the watering supply pipe is equalized thereabout. There is an evenly distributed flow of water through the perforations 8 in dispensing pipes 7. The pressure is the same at each end of the dispensing pipes 7 and is equalized at all points therealong, so that there is even emission of water through the orifices 8 throughout the system. Since the pressure is equalized throughout the system, there is no undue jetting of water in any particular locality to provide voids in the earth, or to permit over-watering at some areas and under-watering at other areas.

The system is easy and simple to install, either with the rigid metallic pipes or with the flexible plastic or rubber pipes. It is simply necessary to lay out the pattern of pipes by digging narrow trenches therefor, lay the pipe therein, connect the pipes and cover the pipes. Preferably a layer of rather coarse screened and sized aggregate, such as pea gravel, is placed in the bottom of the trenches and the perforated dispersal conduits are on top thereof with the perforations facing downwardly. This permits flow of water between the perforations along the trenches. The watering system may be easily turned on and off by turning the globe valve 6.

A further advantage of the system is that there are no dead ends where foreign particles can collect to stop up the pipes.

It will be understood that other and further embodiments of my invention may be made without departing from the spirit and scope of the appended claims.

Having described my invention, I claim:

1. In a sub-surface watering system of the type described, a common water supply source, a continuous imperforate peripheral conduit buried beneath the surface of the soil and extending entirely around a predetermined area to be watered, said peripheral conduit having terminal points connected to said common water supply source, and a plurality of parallel, spaced dispensing conduits buried beneath the surface of the soil and connected at opposite ends into said peripheral conduit, and being positioned within the area defined by said peripheral conduit, said dispensing conduits having substantially equally spaced perforations therein, said perforations being of substantially equal diameter, said peripheral and dispensing conduits being on common horizontal planes, the combined areas of said perforations being not more than the total interior cross-sectional area of the peripheral and dispensing conduits, whereby a uniform flow of water is emitted from said perforations upon flow of water from said common water source.

2. The combination called for in claim 1 wherein the conduits are buried in trenches dug in the soil; the perforations are directed downwardly; and a layer of relatively coarse aggregate is provided along the bottoms of the trenches beneath the perforated conduits.

References Cited by the Examiner

UNITED STATES PATENTS

| | | |
|---|---|---|
| 218,100 | 7/1879 | Whyler. |
| 888,217 | 5/1908 | Bishop _____ 61—13 |
| 998,253 | 7/1911 | McCrimmon _____ 61—13 X |
| 1,591,453 | 7/1926 | Heermans _____ 61—12 |
| 1,895,335 | 1/1933 | Maxen. |
| 2,509,042 | 5/1950 | McIlroy. |
| 2,536,196 | 1/1951 | MacLeod _____ 61—13 |
| 2,947,109 | 8/1960 | Davis et al. _____ 61—13 X |

FOREIGN PATENTS

| | | |
|---|---|---|
| 20,820 | 6/1929 | Australia. |

EARL J. WITMER, *Primary Examiner.*